(12) United States Patent
Chen et al.

(10) Patent No.: US 11,361,414 B2
(45) Date of Patent: Jun. 14, 2022

(54) METHOD AND SYSTEM FOR ENHANCING IMAGE, AND COMPUTER READABLE STORAGE MEDIUM

(71) Applicant: SHENZHEN TCL NEW TECHNOLOGY CO., LTD., Guangdong (CN)

(72) Inventors: Yixin Chen, Guangdong (CN); Renli Xie, Guangdong (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 107 days.

(21) Appl. No.: 16/761,260

(22) PCT Filed: Apr. 11, 2019

(86) PCT No.: PCT/CN2019/082219
§ 371 (c)(1),
(2) Date: May 3, 2020

(87) PCT Pub. No.: WO2020/042621
PCT Pub. Date: Mar. 5, 2020

(65) Prior Publication Data
US 2020/0279356 A1 Sep. 3, 2020

(30) Foreign Application Priority Data

Aug. 27, 2018 (CN) .......................... 201810982192.9

(51) Int. Cl.
*G06T 7/00* (2017.01)
*G06T 5/40* (2006.01)
*G06T 7/11* (2017.01)
*G06T 5/20* (2006.01)

(52) U.S. Cl.
CPC .................. *G06T 5/40* (2013.01); *G06T 5/20* (2013.01); *G06T 7/11* (2017.01)

(58) Field of Classification Search
CPC ...... G06T 5/009; G06T 5/40; G09G 2320/066
See application file for complete search history.

(56) References Cited

U.S. PATENT DOCUMENTS 6,285,413 B1 * 9/2001 Akbayir .................. H04N 5/20
348/671
2005/0280869 A1 * 12/2005 Kameyama .............. H04N 1/60
358/3.01

(Continued)

FOREIGN PATENT DOCUMENTS

CN     101873429 A    10/2010
CN     101902562 A    12/2010

(Continued)

OTHER PUBLICATIONS

International Search Report of PCT Patent Application No. PCT/CN2019/082219 dated Jul. 3, 2019.
1st Office Action of counterpart Chinese Patent Application No. 201810982192.9 dated Sep. 2, 2020.

*Primary Examiner* — Li Liu
(74) *Attorney, Agent, or Firm* — Nathan & Associates; Menachem Nathan

(57) ABSTRACT

The present disclosure provides a method and a system for enhancing an image, and a computer readable storage medium. The method includes: obtaining coding information, histogram distribution information, and a signal characteristic parameter of a display content of the image after detecting a frame signal of the display content (S1); querying a preset first Look-Up-Table (LUT) according to the coding information of the display content to obtain a corresponding control parameter (S2); processing the histogram distribution information according to the control parameter and the signal characteristic parameter to obtain a processed histogram distribution information (S3); obtaining an average product length (APL) control value according to the processed histogram distribution information (S4); and (Continued)

enhancing the image according to the APL control value (S5). Compared with the related arts, the present disclosure improves the image display effect and the user experience without increasing the hardware cost.

13 Claims, 6 Drawing Sheets

(56) References Cited

U.S. PATENT DOCUMENTS

| | | | |
|---|---|---|---|
| 2006/0007511 A1* | 1/2006 | Koyama | H04N 21/4318 358/521 |
| 2010/0328535 A1* | 12/2010 | Okui | G09G 3/3406 348/578 |
| 2018/0061300 A1* | 3/2018 | Chen | G09G 3/2003 |
| 2018/0232867 A1* | 8/2018 | Park | H04N 5/235 |

FOREIGN PATENT DOCUMENTS

| | | |
|---|---|---|
| CN | 102457250 A | 5/2012 |
| CN | 105135592 A | 12/2015 |
| CN | 106651819 A | 5/2017 |
| CN | 107293265 A | 10/2017 |
| CN | 107945163 A | 4/2018 |
| CN | 107948554 A | 4/2018 |
| EP | 0416311 A2 | 3/1991 |
| WO | 2010036722 A1 | 4/2010 |

* cited by examiner

Original state            After applying the algorithm

METHOD AND SYSTEM FOR ENHANCING IMAGE, AND COMPUTER READABLE STORAGE MEDIUM

CROSS REFERENCE TO RELATED APPLICATIONS

The present disclosure claims the priority of Chinese Patent Application No. 201810982192.9, entitled "METHOD AND SYSTEM FOR ENHANCING IMAGE, AND COMPUTER READABLE STORAGE MEDIUM", filed on Aug. 27, 2018, the entire disclosure of which is hereby incorporated by reference in its entirety.

TECHNICAL FIELD

The present disclosure relates to the technical field of image processing technologies, and in particular, to a method and a system for enhancing an image based on APL, and a computer readable storage medium.

BACKGROUND

Image enhancement technology has always been an important research direction for many display manufacturers, because appropriate image enhancement is conducive to enhancing the layered sense of the image and deepening the stereoscopic of the image, thereby improving the display quality of the display.

There are many image enhancement technology solutions applied to the display, but in principle, they are all achieved by changing light transmission, or electrical transmission, or a combination of both.

However, these solutions have certain flaws. Taking the solution achieved by changing light transmission as an example, in order to get a darker and brighter effect, it is necessary to have higher requirements on the power supply. The power control must be more precise and meticulous to achieve the darker effect, and it needs to consume higher power to improve luminance. In addition, the level of requirements for the panel must also be increased, which will inevitably lead to a corresponding increase in costs.

Besides, there are also many solutions which achieve the goal of image enhancement by changing electrical transmission, but such solutions often sacrifice the details of the signal inappropriately, resulting in incomplete image presentation and failing to truly convey the director's true intentions.

SUMMARY

The main objective of the present disclosure is to provide a method and a system for enhancing an image, and a computer readable storage medium, to improve the screen display effect without increasing the hardware cost.

In order to achieve the above objective, the present disclosure provides a method for enhancing an image, including the following operations:

obtaining coding information, histogram distribution information, and a signal characteristic parameter of a display content of the image after detecting a frame signal of the display content;

querying a preset first Look-Up-Table (LUT) according to the coding information of the display content to obtain a corresponding control parameter;

processing the histogram distribution information according to the control parameter and the signal characteristic parameter to obtain processed histogram distribution information;

obtaining an average product length (APL) control value according to the processed histogram distribution information; and enhancing the image according to the APL control value.

In some embodiments, the signal characteristic parameter includes minimum signal amplitude information and dark state segmentation point information of the display content; the operation of "obtaining a signal characteristic parameter of a display content" includes:

calculating the minimum signal amplitude information and the dark state segmentation point information with a preset rule according to the histogram distribution information; and the operation of "processing the histogram distribution information according to the control parameter and the signal characteristic parameter to obtain processed histogram distribution information" includes:

processing the histogram distribution information according to the control parameter, the minimum signal amplitude information, and the dark state segmentation point information to obtain the processed histogram distribution information.

In some embodiments, the coding information includes maximum display luminance information of a monitor, minimum display luminance information of the monitor, and maximum signal amplitude information of a content; the first LUT includes an MDMAX_LUT, an MDMIN_LUT, and a CLL_LUT;

the operation of "querying a preset first LUT according to the coding information of the display content to obtain a corresponding control parameter" includes:

querying the MDMAX_LUT according to the maximum display luminance information of the monitor, and taking a first return value as a first control parameter;

querying the MDMIN_LUT according to the minimum display luminance information of the monitor, and taking a second return value as a second control parameter; and querying the CLL_LUT according to the maximum signal amplitude information of the content, and taking a third return value as a third control parameter; and the operation of "processing the histogram distribution information according to the control parameter, the minimum signal amplitude information, and the dark state segmentation point information to obtain the processed histogram distribution information" includes:

processing the histogram distribution information according to the first control parameter, the second control parameter, the third control parameter, the minimum signal amplitude information, and the dark state segmentation point information to obtain the processed histogram distribution information.

In some embodiments, the operation of "processing the histogram distribution information according to the first control parameter, the second control parameter, the third control parameter, the minimum signal amplitude information, and the dark state segmentation point information to obtain the processed histogram distribution information" includes:

querying a second LUT according to the minimum signal amplitude information and the dark state segmentation point information to obtain a first weight control coefficient;

generating a first filtering curve according to the minimum signal amplitude information, the dark state segmentation point information, and the first weight control coefficient;

querying a third LUT according to the first control parameter, the second control parameter, and the third control parameter to obtain two second weight control coefficients;

generating a second filtering curve according to the first control parameter, the second control parameter, the third control parameter, and the two second weight control coefficients;

superimposing the first filtering curve and the second filtering curve according to a selection instruction input by a user to generate a third filtering curve; and filtering the histogram distribution information according to the third filtering curve to obtain the processed histogram distribution information.

In some embodiments, the operation of "obtaining an APL control value according to the processed histogram distribution information" includes:

obtaining APL values according to the processed histogram distribution information;

constructing an APL sequence according to the APL values; and obtaining the APL control value with a preset calculation rule according to the APL sequence.

In some embodiments, the operation of "enhancing the image according to the APL control value" includes:

obtaining a control curve according to the APL control value; and superimposing the control curve on a signal processing flow to enhance the image.

Besides, the present disclosure further provides a system for enhancing an image, including a memory, a processor, and a program for enhancing the image stored on the memory, the program, when executed by the processor, implements the following operations:

obtaining coding information, histogram distribution information, and a signal characteristic parameter of a display content of the image after detecting a frame signal of the display content;

querying a preset first Look-Up-Table (LUT) according to the coding information of the display content to obtain a corresponding control parameter;

processing the histogram distribution information according to the control parameter and the signal characteristic parameter to obtain processed histogram distribution information;

obtaining an average product length (APL) control value according to the processed histogram distribution information; and enhancing the image according to the APL control value.

In some embodiments, the program, when executed by the processor, further implements the following operations:

calculating minimum signal amplitude information and dark state segmentation point information with a preset rule according to the histogram distribution information; and processing the histogram distribution information according to the control parameter, the minimum signal amplitude information, and the dark state segmentation point information to obtain the processed histogram distribution information.

In some embodiments, the coding information includes maximum display luminance information of a monitor, minimum display luminance information of the monitor, and maximum signal amplitude information of a content, and the first LUT includes an MDMAX_LUT, an MDMIN_LUT, and a CLL_LUT; and the program, when executed by the processor, further implements the following operations:

querying the MDMAX_LUT according to the maximum display luminance information of the monitor, and taking a first return value as a first control parameter;

querying the MDMIN_LUT according to the minimum display luminance information of the monitor, and taking a second return value as a second control parameter;

querying the CLL_LUT according to the maximum signal amplitude information of the content, and taking a third return value as a third control parameter; and processing the histogram distribution information according to the first control parameter, the second control parameter, the third control parameter, the minimum signal amplitude information, and the dark state segmentation point information to obtain the processed histogram distribution information.

Besides, the present disclosure further provides a computer readable storage medium. The computer readable storage medium stores a program for enhancing an image, the program, when executed by a processor, implements the operations described above.

The present disclosure provides a method and a system for enhancing an image, and a computer readable storage medium. The method includes: obtaining coding information, histogram distribution information, and a signal characteristic parameter of a display content of the image after detecting a frame signal of the display content; querying a preset first Look-Up-Table (LUT) according to the coding information of the display content to obtain a corresponding control parameter; processing the histogram distribution information according to the control parameter and the signal characteristic parameter to obtain processed histogram distribution information; obtaining an average product length (APL) control value according to the processed histogram distribution information; and enhancing the image according to the APL control value, to enhance the image display effect and improve the user experience without increasing the hardware cost.

The realization of the objective, functional characteristics, advantages of the present disclosure are further described with reference to the accompanying drawings.

DETAILED DESCRIPTION OF THE EMBODIMENTS

It should be understood that the specific embodiments described herein are only used to explain the disclosure, and are not intended to limit the disclosure.

The main solutions of the embodiments of the present disclosure are: obtaining coding information, histogram distribution information, and a signal characteristic parameter of a display content of the image after detecting a frame signal of the display content; querying a preset first LUT according to the coding information of the display content to obtain a corresponding control parameter; processing the histogram distribution information according to the control parameter and the signal characteristic parameter to obtain processed histogram distribution information; obtaining an average product length APL control value according to the processed histogram distribution information; and enhancing the image according to the APL control value. As such, the image display effect is improved without increasing the hardware cost, thereby improving the user experience.

Figure 1:
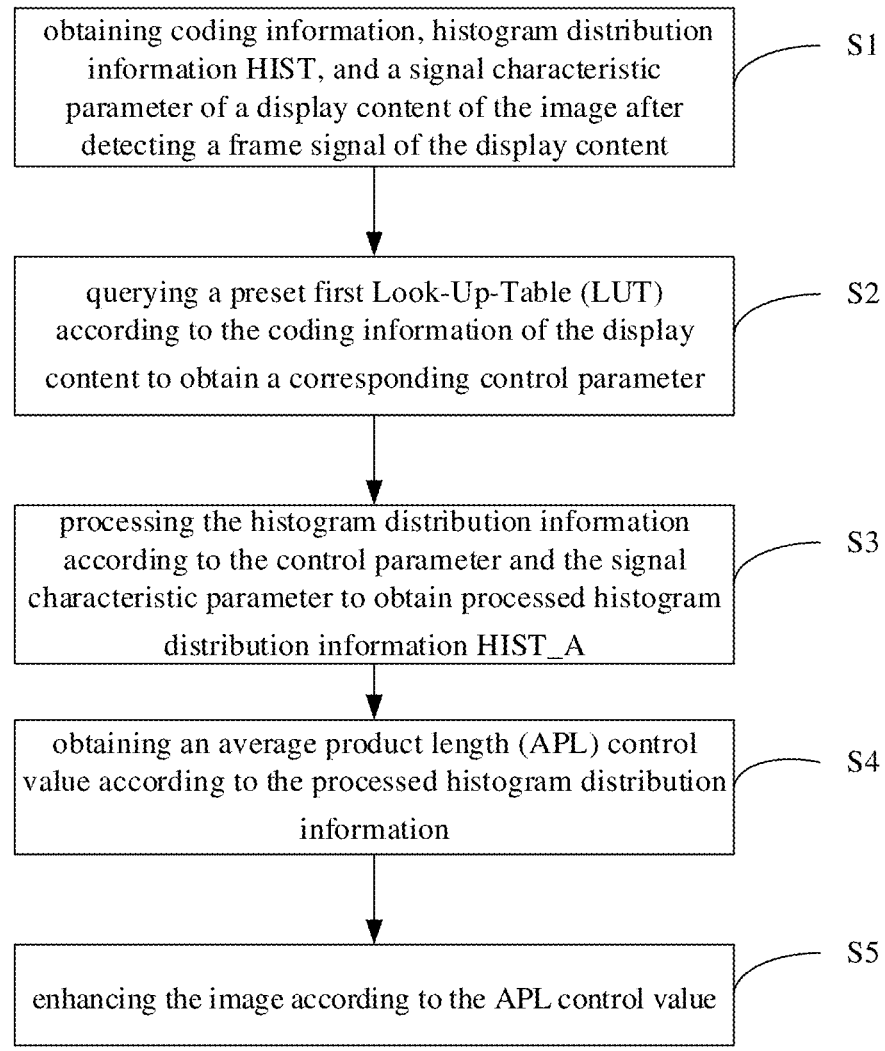
FIG. 1 is a schematic flowchart of a method for enhancing an image according to the present disclosure.

Specially, referring to FIG. 1, FIG. 1 is a schematic flowchart of a method for enhancing an image according to a first embodiment of the present disclosure.

As shown in FIG. 1, the method includes the following operations:

Operation S1, obtaining coding information, histogram distribution information HIST, and a signal characteristic parameter of a display content of the image after detecting a frame signal of the display content.

It should be noted that the method for enhancing the image of the present disclosure is applied to an image display device such as a television. The device may include a signal analysis module, a core calculation module, a histogram reprocessing module, a calculation module, a signal enhancement module, and a scene recognition module. In the following, a television is used as an example to describe the solution of the embodiments of the present disclosure in detail.

Figure 2:
FIG. 2 is a schematic diagram of a frame screen currently displayed by a television in the present embodiment.

In the present embodiment, the film source signal is input to the television. When the frame signal of the image display content is detected, the television software may obtain the coding information, the histogram distribution information HIST, and the signal characteristic parameter of the display content after a series of coding and decoding processes. Please referring to FIG. 2, FIG. 2 is a schematic diagram of a frame currently displayed by a television.

The obtained signal characteristic may be processed by the signal analysis module to obtain corresponding histogram distribution information HIST.

Operation S2: querying a preset first Look-Up-Table (LUT) according to the coding information of the display content to obtain a corresponding control parameter.

The first LUT is a one-dimensional table, and its specific settings can be summarized and improved based on multiple experimental data.

Operation S3: processing the histogram distribution information according to the control parameter and the signal characteristic parameter to obtain processed histogram distribution information HIST_A.

After obtaining the corresponding control parameter, the histogram reprocessing module may process the histogram distribution information HIST according to the control parameter and the signal characteristic parameter to obtain the processed histogram distribution information HIST_A.

Operation S4: obtaining an average product length (APL) control value according to the processed histogram distribution information.

After obtaining the processed histogram distribution information, an APL (an average product length refers to the average number of products produced from the occurrence of a process anomaly to the occurrence of the anomaly in the control chart) control value is obtained according to the processed histogram distribution information.

Operation S5: enhancing the image according to the APL control value.

Figure 3:
FIG. 3 is a comparison diagram of effects before and after applying the method for enhancing the image according to the embodiment of the present disclosure.

Referring to FIG. 3, FIG. 3 is a comparison diagram of effects before and after applying the method of the present disclosure. By enhancing the image according to the APL control value, not only can it improve the contrast of the image of the monitor, it can enhance the layered sense of the image and deepen the stereoscopic of the image, but also can retain the details of the dark state and the level of luminance, so as to achieve the purpose of reasonably distributing the brightness interval of the signal.

The present disclosure provides a method and a system for enhancing an image, and a computer readable storage medium. The method includes: obtaining coding information, histogram distribution information, and a signal characteristic parameter of a display content of the image after detecting a frame signal of the display content; querying a preset first Look-Up-Table (LUT) according to the coding information of the display content to obtain a corresponding control parameter; processing the histogram distribution information according to the control parameter and the signal characteristic parameter to obtain processed histogram distribution information HIST_A; obtaining an average product length (APL) control value according to the processed histogram distribution information; and enhancing the image according to the APL control value, to enhance the image display effect and improve the user experience without increasing the cost of hardware.

Specially, in the present embodiment, the signal characteristic parameter includes minimum signal amplitude information and dark state segmentation point information of the display content.

In the operation S1, the operation of "obtaining a signal characteristic parameter of a display content" includes:

Operation S11, calculating the minimum signal amplitude information and the dark state segmentation point information with a preset rule according to the histogram distribution information HIST.

Specially, according to the histogram distribution information HIST, the signal analysis module may calculate a gray level and a dark state segmentation point corresponding to the minimum signal according to a preset rule, for the core calculation module to call.

Figure 4:
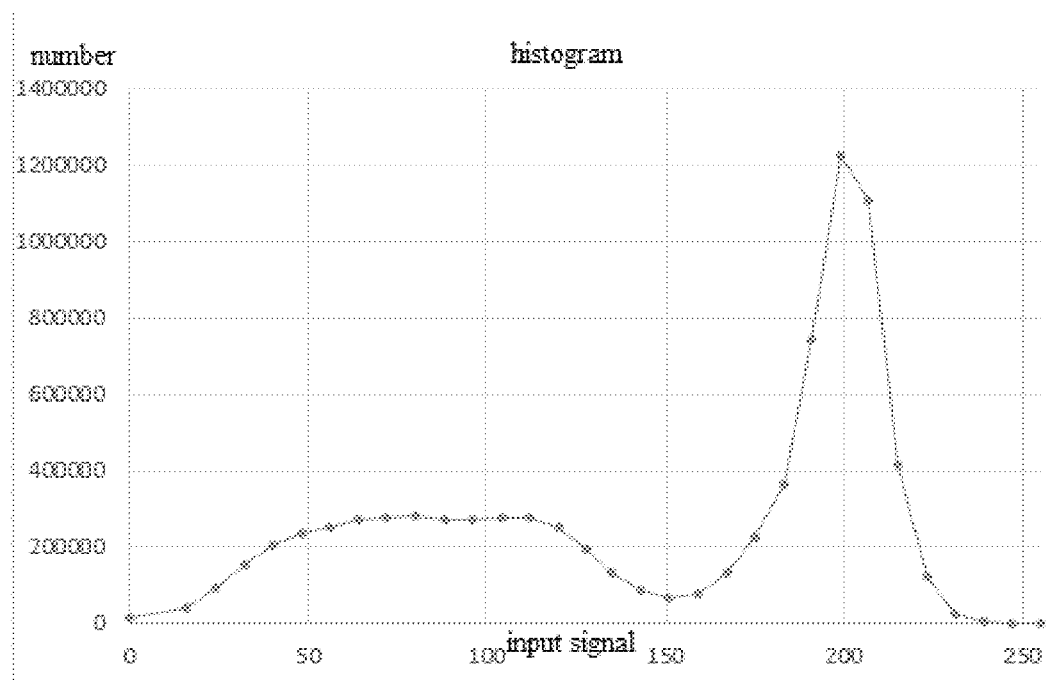
FIG. 4 is a schematic diagram of histogram distribution information corresponding to FIG. 2.

Take the histogram distribution information shown in FIG. 4 as an example (FIG. 4 is the histogram distribution corresponding to FIG. 2), the gray level of the minimum signal of the entire image should be in the low level 8 histogram, that is, the minimum signal amplitude $In_{max}=64$.

In an image, when the ratio of the number of signals below a certain signal interval multiplied by the sum of the signal values at the endpoints of the signal interval is closest to a certain level (such as 8%, the value depends on the actual situation), the signal interval point is called the dark state segmentation point K. Taking the histogram distribution information shown in FIG. 4 as an example, the dark state segmentation point K is 72.

In the operation S3, the operation of "processing the histogram distribution information according to the control parameter and the signal characteristic parameter to obtain processed histogram distribution information HIST_A" includes:

Operation S31, processing the histogram distribution information according to the control parameter, the minimum signal amplitude information, and the dark state segmentation point information to obtain the processed histogram distribution information HIST_A.

Figure 5:
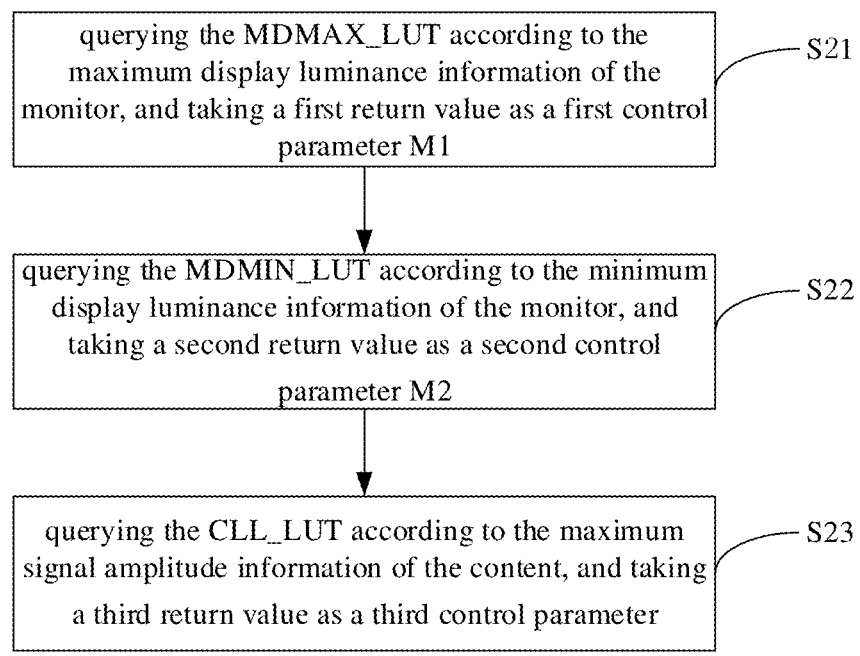
FIG. 5 is a detailed flowchart of operation S2 in the present embodiment.

Further, referring to FIG. 5, FIG. 5 is a detailed flowchart of querying a preset first LUT according to the coding information of the display content to obtain the corresponding control parameter in operation S2 of the embodiment.

It should be understood that in the present embodiment, the coding information (Metadata) includes maximum display luminance information of a monitor (MasterDisplayMaxLuminance), minimum display luminance information of the monitor (MasterDisplayMinLuminance), and maximum signal amplitude information of a content (ContentLightLv), and the first LUT includes an MDMAX_LUT, an MDMIN_LUT, and a CLL_LUT.

As shown in FIG. 5, in the operation S2 of the present embodiment, the operation of "querying a preset first Look-Up-Table (LUT) according to the coding information of the display content to obtain a corresponding control parameter" includes:

Operation S21, querying the MDMAX_LUT according to the maximum display luminance information of the monitor, and taking a first return value as a first control parameter M1.

Specially, querying the MDMAX_LUT according to the input maximum display luminance MasterDisplayMaxLuminance, and taking the first return value as the first control parameter M1.

Operation S22, querying the MDMIN_LUT according to the minimum display luminance information of the monitor, and taking a second return value as a second control parameter M2.

Specially, querying the MDMIN_LUT according to the input minimum display luminance MasterDisplayMinLuminance, and taking the second return value as the second control parameter M2.

Operation S23, querying the CLL_LUT according to the maximum signal amplitude information of the content, and taking a third return value as a third control parameter.

Specially, querying the CLL_LUT according to the input content signal amplitude ContentLightLv, and taking a third return value as the third control parameter M3.

In the operation S31, the operation of "processing the histogram distribution information according to the control parameter, the minimum signal amplitude information, and the dark state segmentation point information to obtain the processed histogram distribution information HIST_A" includes:

Operation S311, processing the histogram distribution information HIST_A according to the first control parameter M1, the second control parameter M2, the third control parameter M3, the minimum signal amplitude information, and the dark state segmentation point information to obtain the processed histogram distribution information HIST_A.

Figure 6:
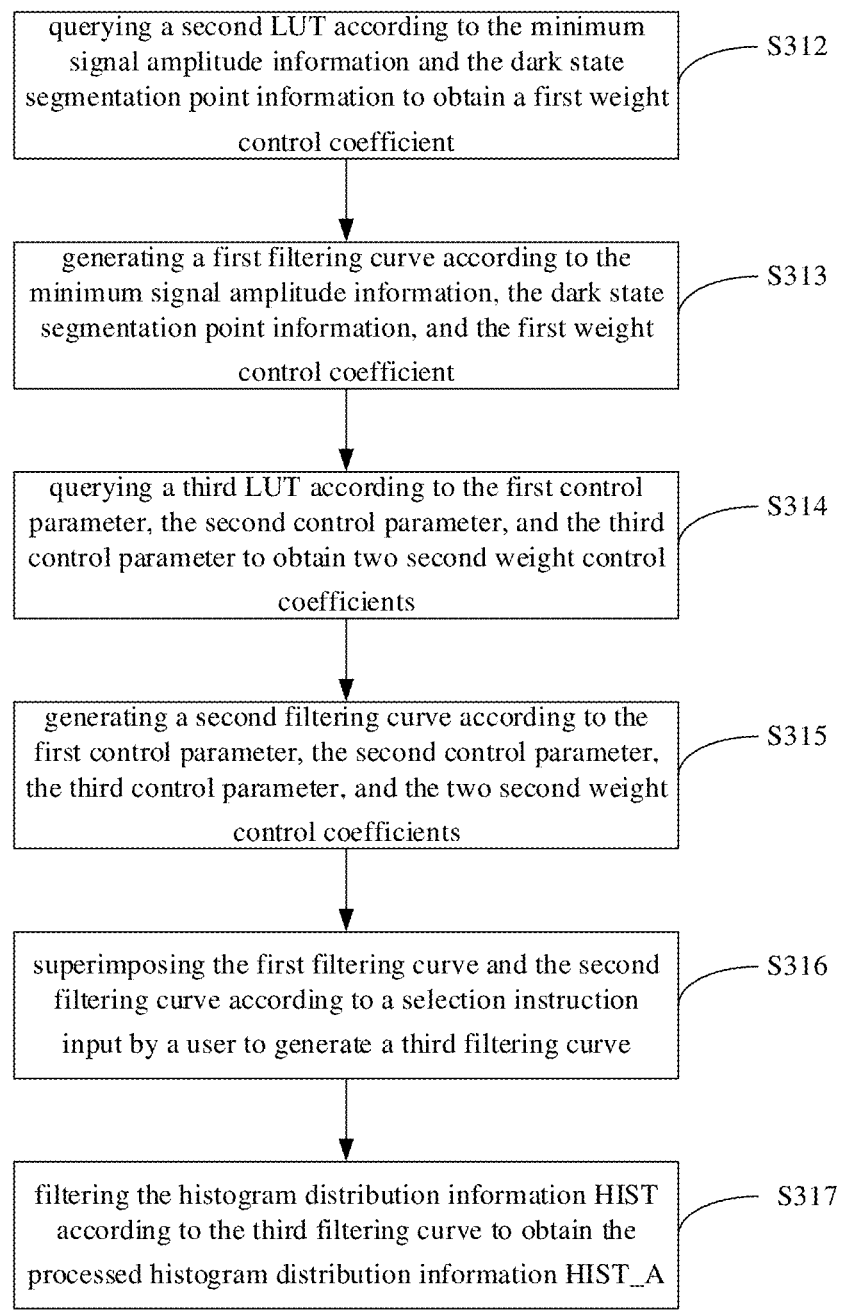
FIG. 6 is a detailed flowchart of operation S311 in the present embodiment.

Specially, referring to FIG. 6, FIG. 6 is a detailed flowchart of the above operation S311.

As shown in FIG. 6, operation S311 includes:

Operation S312, querying a second LUT according to the minimum signal amplitude information and the dark state segmentation point information to obtain a first weight control coefficient.

Specially, querying a corresponding two-dimensional list LSIG_LUT according to the minimum signal amplitude information Inmix and the dark state segmentation point K to obtain a first weight control coefficient A1.

Operation S313, generating a first filtering curve according to the minimum signal amplitude information, the dark state segmentation point information, and the first weight control coefficient.

Specially, generating a first filtering curve L1=F1(Inmix, K, A1) by using the minimum signal amplitude information Inmix, the dark state segmentation point information K, and the weight control coefficient A1 as input parameters.

Operation S314, querying a third LUT according to the first control parameter, the second control parameter, and the third control parameter to obtain two second weight control coefficients.

Specially, querying a corresponding three-dimensional list TSIG_LUT according to the first control parameter M1, the second control parameter M2, and the third control parameter M3 to obtain two second weight control coefficients A2 and A3.

Operation S315, generating a second filtering curve according to the first control parameter, the second control parameter, the third control parameter, and the two second weight control coefficients.

Specially, generating a second filtering curve L2=F2(M1, M2, M3, A2, A3) according to the first control parameter M1, the second control parameter M2, the third control parameter M3, and the two second weight control coefficients A2 and A3.

Operation S316, superimposing the first filtering curve and the second filtering curve according to a selection instruction input by a user to generate a third filtering curve.

Figure 7:
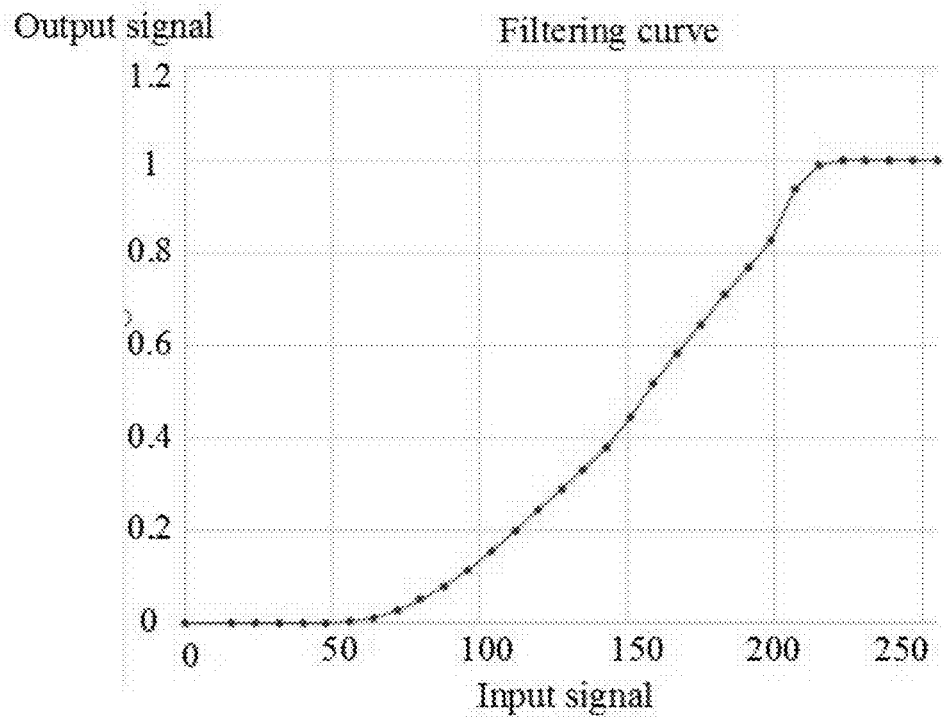
FIG. 7 is a schematic diagram of a more typical filtering curve in the present embodiment.

Specially, the first filtering curve and the second filtering curve may be superimposed according to user requirements. The user can select the superimposed point and weight A4 to obtain the final third filtering curve L3=F3 (L1, L2, A4). FIG. 7 is a schematic diagram of a more typical filtering curve.

Operation S317, filtering the histogram distribution information HIST according to the third filtering curve to obtain the processed histogram distribution information HIST_A.

After the third filtering curve is obtained, the third filtering curve L3 is applied to the histogram information HIST to obtain the filtered histogram information HIST_A.

Further, in the operation S4 of the present embodiment, the operation of "obtaining an average product length (APL) control value according to the processed histogram distribution information" includes:

Operation S41, obtaining APL values according to the processed histogram distribution information;

Operation S42, constructing an APL sequence according to the APL values; and

Operation S43, obtaining the APL control value with a preset calculation rule according to the APL sequence.

Specially, after the processed histogram distribution information HIST_A is obtained, an APL_i value is obtained through calculation by the core calculation module. With 10 frames as the window size, 10 APL_i (i=1, 2 . . . 10) are obtained in sequence, which form an APL sequence. The APL sequence is input into the scene recognition module, and is inferred and calculated by the core calculation module to obtain a final APL control value APL_A—.

Further, in the operation S5, the operation of "enhancing the image according to the APL control value" includes:

Operation S51, obtaining a control curve according to the APL control value; and Operation S52, superimposing the control curve on a signal processing flow to enhance the image.

Specially, after obtaining the final APL control value APL_A, the signal enhancement module will output a control curve L4 correspondingly, L4=F4 (APL_A). L4 is superimposed on the appropriate position in the chip signal processing flow to enhance the image in real time.

In summary, the present disclosure provides a method for enhancing an image. The method includes: obtaining coding information, histogram distribution information, and a signal characteristic parameter of a display content of the image after detecting a frame signal of the display content; querying a preset first Look-Up-Table (LUT) according to the coding information of the display content to obtain a corresponding control parameter; processing the histogram distribution information according to the control parameter and the signal characteristic parameter to obtain processed histogram distribution information; obtaining an average product length (APL) control value according to the processed histogram distribution information; and enhancing the image according to the APL control value. Therefore, without increasing any hardware cost, the display screen contrast can be improved to a reasonable degree, enhancing the layered sense of the image and deepening the stereoscopic of the image, which achieves the effect of truly conveying the director's intention, allowing the user to see the image effect that the director wants the user to see, and improving the user experience.

In order to achieve the above objective, the present disclosure further provides a system for enhancing an image, including a memory, a processor, and a program for enhancing the image stored on the memory, the program, when executed by the processor, implements the operations as described above.

Figure 8:
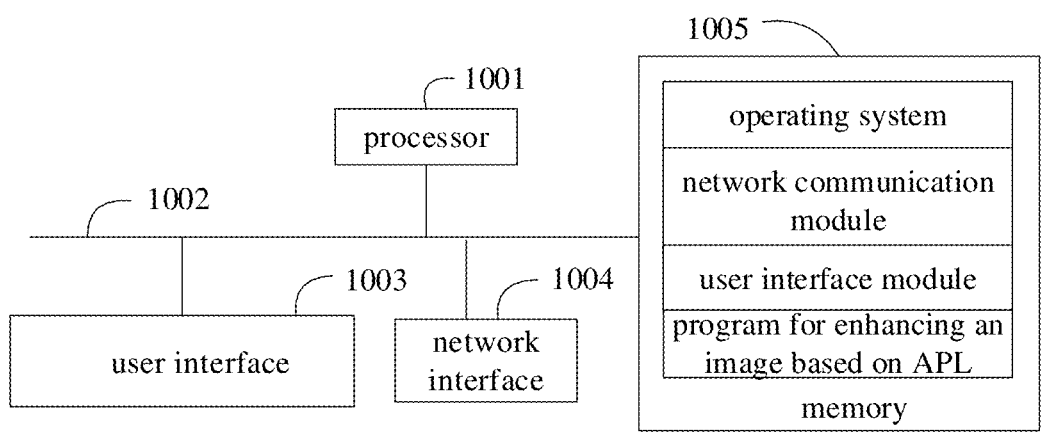
FIG. 8 is a schematic structural diagram of a terminal according to an embodiment of the present disclosure.

Specially, as shown in FIG. 8, the terminal carried by the system of the embodiment may include a processor 1001, such as a CPU, a network interface 1004, a user interface 1003, a memory 1005, and a communication bus 1002. The communication bus 1002 is configured to implement connection and communication between these components. The user interface 1003 may include a display, an input unit such as a keyboard, and the optional user interface 1003 may further include a standard wired interface and a wireless interface. The network interface 1004 may optionally include a standard wired interface and a wireless interface (such as a WI-FI interface). The memory 1005 may be a high-speed RAM memory or a non-volatile memory, such as a magnetic disk memory. The memory 1005 may optionally be a storage device independent of the foregoing processor 1001.

Those skilled in the art can understand that the terminal structure shown in FIG. 8 does not constitute a limitation on the terminal, and may include more or fewer components than shown, or some combination of components, or differently arranged components.

As shown in FIG. 8, the memory 1005 as a computer storage medium may include an operation device, a network communication module, a user interface module, and a program for enhancing an image.

In the system shown in FIG. 8, the network interface 1004 is mainly configured to connect to a network server and perform data communication with the network server; the user interface 1003 is mainly configured to interact with a user terminal and receive instructions input by the user; the processor 1001 may be configured to call a program for enhancing an image stored on the memory 1005 and perform the following operations:

obtaining coding information, histogram distribution information, and a signal characteristic parameter of a display content of the image after detecting a frame signal of the display content;

querying a preset first Look-Up-Table (LUT) according to the coding information of the display content to obtain a corresponding control parameter;

processing the histogram distribution information according to the control parameter and the signal characteristic parameter to obtain processed histogram distribution information;

obtaining an average product length (APL) control value according to the processed histogram distribution information; and enhancing the image according to the APL control value.

Further, the processor 1001 may call the program for enhancing the image stored on the memory 1005 and perform the following operations:

calculating minimum signal amplitude information and dark state segmentation point information with a preset rule according to the histogram distribution information; and processing the histogram distribution information according to the control parameter, the minimum signal amplitude information, and the dark state segmentation point information to obtain the processed histogram distribution information.

Further, the processor 1001 may call the program for enhancing the image stored on the memory 1005 and perform the following operations:

querying the MDMAX_LUT according to the maximum display luminance information of the monitor, and taking a first return value as a first control parameter;

querying the MDMIN_LUT according to the minimum display luminance information of the monitor, and taking a second return value as a second control parameter;

querying the CLL_LUT according to the maximum signal amplitude information of the content, and taking a third return value as a third control parameter; and processing the histogram distribution information according to the first control parameter, the second control parameter, the third control parameter, the minimum signal amplitude information, and the dark state segmentation point information to obtain the processed histogram distribution information.

In the technical solutions of the present disclosure, the system performs: obtaining coding information, histogram distribution information, and a signal characteristic parameter of a display content of the image after detecting a frame signal of the display content; querying a preset first Look-Up-Table (LUT) according to the coding information of the display content to obtain a corresponding control parameter; processing the histogram distribution information according to the control parameter and the signal characteristic parameter to obtain processed histogram distribution information; obtaining an average product length (APL) control value according to the processed histogram distribution information; and enhancing the image according to the APL control value, to enhance the image display effect and improve the user experience without increasing the cost of hardware.

In order to achieve the above objective, the present disclosure further provides a computer readable storage medium. The computer readable storage medium stores a program for enhancing an image, the program, when executed by a processor, implements the operations as described above, and details are not described herein again.

Compared with the related arts, the present disclosure provides a method and a system for enhancing an image, and a computer readable storage medium. The method includes: obtaining coding information, histogram distribution information, and a signal characteristic parameter of a display content of the image after detecting a frame signal of the display content; querying a preset first Look-Up-Table (LUT) according to the coding information of the display content to obtain a corresponding control parameter; processing the histogram distribution information according to the control parameter and the signal characteristic parameter to obtain processed histogram distribution information; obtaining an average product length (APL) control value according to the processed histogram distribution information; and enhancing the image according to the APL control value, to enhance the image display effect and improve the user experience without increasing the cost of hardware.

It should be noted that, the serial numbers of the embodiments of the present disclosure are only for description, and do not represent the advantages and disadvantages of the embodiments.

Through the description of the above embodiments, those skilled in the art can clearly understand that the method in the foregoing embodiment can be implemented by means of software plus a necessary universal hardware platform, and of course, also by hardware, but in many cases the former is a better implementation. Based on this understanding, the technical solution of the present disclosure, or the part that contributes to the existing technology, can be embodied in the form of a software product. The computer software product is stored on a storage medium (such as a ROM/RAM, a magnetic disk, and an optical disc) as described above, and includes several instructions for causing a terminal device (such as a mobile phone, a TV, a computer, etc.) to execute the methods of the embodiments of the present disclosure.

The above are only preferred embodiments of the present disclosure, and thus do not limit the patent scope of the present disclosure. Any equivalent structure or equivalent process transformation made by using the contents of the specification and drawings of the present disclosure, or directly or indirectly used in other related technical fields, is similarly included in the scope of the present disclosure.

What is claimed is:

1. A method for enhancing an image, comprising the following operations:
    obtaining coding information, histogram distribution information, and a signal characteristic parameter of a display content of the image after detecting a frame signal of the display content, wherein the coding information comprises maximum display luminance information of a monitor, minimum display luminance information of the monitor, and maximum signal amplitude information of a content, and the signal characteristic parameter comprises minimum signal amplitude information and dark state segmentation point information of the display content;
    querying a preset first Look-Up-Table (LUT) according to the coding information of the display content to obtain a corresponding control parameter, wherein the corresponding control parameter comprises a first control parameter, a second control parameter, and a third control parameter, and the operation of "querying a preset first Look-Up-Table (LUT) according to the coding information of the display content to obtain a corresponding control parameter" comprises:
        obtaining the first control parameter according to the maximum display luminance information of the monitor;
        obtaining the second control parameter according to the minimum display luminance information of the monitor; and
        obtaining the third control parameter according to the maximum signal amplitude information of the content;
    querying a second LUT according to the minimum signal amplitude information and the dark state segmentation point information to obtain a first weight control coefficient;
    generating a first filtering curve according to the minimum signal amplitude information, the dark state segmentation point information, and the first weight control coefficient;
    querying a third LUT according to the first control parameter, the second control parameter, and the third control parameter to obtain two second weight control coefficients;
    generating a second filtering curve according to the first control parameter, the second control parameter, the third control parameter, and the two second weight control coefficients;
    superimposing the first filtering curve and the second filtering curve according to a selection instruction input by a user to generate a third filtering curve;
    filtering the histogram distribution information according to the third filtering curve to obtain processed histogram distribution information;
    obtaining an average product length (APL) control value according to the processed histogram distribution information; and
    enhancing the image according to the APL control value.

2. The method of claim 1, wherein:
    the operation of "obtaining a signal characteristic parameter of a display content" comprises:
    calculating the minimum signal amplitude information and the dark state segmentation point information with a preset rule according to the histogram distribution information.

3. The method of claim 2, wherein:
    the first LUT comprises an MDMAX_LUT, an MDMIN_LUT, and a CLL_LUT;
    the operation of "obtaining the first control parameter according to the maximum display luminance information of the monitor" comprises:
    querying the MDMAX_LUT according to the maximum display luminance information of the monitor, and taking a first return value as the first control parameter;
    the operation of "obtaining the second control parameter according to the minimum display luminance information of the monito" comprises:
    querying the MDMIN_LUT according to the minimum display luminance information of the monitor, and taking a second return value as the second control parameter; and
    the operation of "obtaining the third control parameter according to the maximum signal amplitude information of the content" comprises:
    querying the CLL_LUT according to the maximum signal amplitude information of the content, and taking a third return value as the third control parameter.

4. The method of claim 3, wherein the operation of "obtaining an APL control value according to the processed histogram distribution information" comprises:
    obtaining APL values according to the processed histogram distribution information;

constructing an APL sequence according to the APL values; and obtaining the APL control value with a preset calculation rule according to the APL sequence.

5. The method of claim 4, the operation of "enhancing the image according to the APL control value" comprises:

obtaining a control curve according to the APL control value; and superimposing the control curve on a signal processing flow to enhance the image.

6. A system for enhancing an image, comprising a memory, a processor, and a program for enhancing the image stored on the memory, the program, when executed by the processor, implements the following operations:

obtaining coding information, histogram distribution information, and a signal characteristic parameter of a display content of the image after detecting a frame signal of the display content, wherein the coding information comprises maximum display luminance information of a monitor, minimum display luminance information of the monitor, and maximum signal amplitude information of a content, and the signal characteristic parameter comprises minimum signal amplitude information and dark state segmentation point information of the display content;

querying a preset first Look-Up-Table (LUT) according to the coding information of the display content to obtain a corresponding control parameter wherein the corresponding control parameter comprises a first control parameter, a second control parameter, and a third control parameter, and the operation of "querying a preset first Look-Up-Table (LUT) according to the coding information of the display content to obtain a corresponding control parameter" comprises:

obtaining the first control parameter according to the maximum display luminance information of the monitor;

obtaining the second control parameter according to the minimum display luminance information of the monitor; and obtaining the third control parameter according to the maximum signal amplitude information of the content;

querying a second LUT according to the minimum signal amplitude information and the dark state segmentation point information to obtain a first weight control coefficient;

generating a first filtering curve according to the minimum signal amplitude information, the dark state segmentation point information, and the first weight control coefficient;

querying a third LUT according to the first control parameter, the second control parameter, and the third control parameter to obtain two second weight control coefficients;

generating a second filtering curve according to the first control parameter, the second control parameter, the third control parameter, and the two second weight control coefficients;

superimposing the first filtering curve and the second filtering curve according to a selection instruction input by a user to generate a third filtering curve;

filtering the histogram distribution information according to the third filtering curve to obtain processed histogram distribution information;

obtaining an average product length (APL) control value according to the processed histogram distribution information; and enhancing the image according to the APL control value.

7. The system of claim 6, wherein the program, when executed by the processor, further implements the following operations:

calculating minimum signal amplitude information and dark state segmentation point information with a preset rule according to the histogram distribution information.

8. The system of claim 7, wherein:

the first LUT comprises an MDMAX_LUT, an MDMIN_LUT, and a CLL_LUT; and the program, when executed by the processor, further implements the following operations:

querying the MDMAX_LUT according to the maximum display luminance information of the monitor, and taking a first return value as the first control parameter;

querying the MDMIN_LUT according to the minimum display luminance information of the monitor, and taking a second return value as the second control parameter;

querying the CLL_LUT according to the maximum signal amplitude information of the content, and taking a third return value as the third control parameter.

9. A non-transitory computer readable storage medium, wherein the computer readable storage medium stores a program for enhancing an image, the program, when executed by a processor, implements the following operations:

obtaining coding information, histogram distribution information, and a signal characteristic parameter of a display content of the image after detecting a frame signal of the display content, wherein the coding information comprises maximum display luminance information of a monitor, minimum display luminance information of the monitor, and maximum signal amplitude information of a content, and the signal characteristic parameter comprises minimum signal amplitude information and dark state segmentation point information of the display content;

querying a preset first Look-Up-Table (LUT) according to the coding information of the display content to obtain a corresponding control parameter, wherein the corresponding control parameter comprises a first control parameter, a second control parameter, and a third control parameter, and the operation of "querying a preset first Look-Up-Table (LUT) according to the coding information of the display content to obtain a corresponding control parameter" comprises:

obtaining the first control parameter according to the maximum display luminance information of the monitor;

obtaining the second control parameter according to the minimum display luminance information of the monitor; and obtaining the third control parameter according to the maximum signal amplitude information of the content;

querying a second LUT according to the minimum signal amplitude information and the dark state segmentation point information to obtain a first weight control coefficient;

generating a first filtering curve according to the minimum signal amplitude information, the dark state segmentation point information, and the first weight control coefficient;

querying a third LUT according to the first control parameter, the second control parameter, and the third control parameter to obtain two second weight control coefficients;

generating a second filtering curve according to the first control parameter, the second control parameter, the third control parameter, and the two second weight control coefficients;

superimposing the first filtering curve and the second filtering curve according to a selection instruction input by a user to generate a third filtering curve;

filtering the histogram distribution information according to the third filtering curve to obtain processed histogram distribution information;

obtaining an average product length (APL) control value according to the processed histogram distribution information; and enhancing the image according to the APL control value.

10. The non-transitory computer readable storage medium of claim 9, wherein:

the program, when executed by the processor, further implements the following operations:

calculating the minimum signal amplitude information and the dark state segmentation point information with a preset rule according to the histogram distribution information.

11. The non-transitory computer readable storage medium of claim 10, wherein:

the first LUT comprises an MDMAX_LUT, an MDMIN_LUT, and a CLL_LUT; and the program, when executed by the processor, further implements the following operations:

querying the MDMAX_LUT according to the maximum display luminance information of the monitor, and taking a first return value as the first control parameter;

querying the MDMIN_LUT according to the minimum display luminance information of the monitor, and taking a second return value as the second control parameter; and querying the CLL_LUT according to the maximum signal amplitude information of the content, and taking a third return value as the third control parameter.

12. The non-transitory computer readable storage medium of claim 11, wherein the program, when executed by the processor, further implements the following operations:

obtaining APL values according to the processed histogram distribution information;

constructing an APL sequence according to the APL values; and obtaining the APL control value with a preset calculation rule according to the APL sequence.

13. The non-transitory computer readable storage medium of claim 9, wherein the program, when executed by the processor, further implements the following operations:

obtaining a control curve according to the APL control value; and superimposing the control curve on a signal processing flow to enhance the image.

* * * * *